US012627672B2

(12) United States Patent (10) Patent No.: US 12,627,672 B2

Wilczynski et al. (45) Date of Patent: *May 12, 2026

(54) ENFORCING GRANULAR ACCESS CONTROL POLICY

(71) Applicant: Palantir Technologies Inc., Denver, CO (US)

(72) Inventors: Peter Wilczynski, Denver, CO (US); Arseny Bogomolov, Arlington, VA (US); Alexander Mark, New York, NY (US); Teofana Hadzhiganeva, Bethesda, MD (US); Kevin Ng, New York, NY (US); Nathaniel Klein, Washington, DC (US); Sharon Hao, Redwood City, CA (US)

(73) Assignee: Palantir Technologies Inc., Aventura, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/773,300

(22) Filed: Jul. 15, 2024

(65) Prior Publication Data

US 2024/0430269 A1     Dec. 26, 2024

Related U.S. Application Data

(60) Continuation of application No. 18/238,871, filed on Aug. 28, 2023, now Pat. No. 12,063,218, which is a continuation of application No. 17/992,737, filed on Nov. 22, 2022, now Pat. No. 11,785,017, which is a division of application No. 17/386,060, filed on Jul. 27, 2021, now Pat. No. 11,558,393, which is a (Continued)

(51) Int. Cl.
*H04L 9/40* (2022.01)

(52) U.S. Cl.
CPC ................................. *H04L 63/104* (2013.01)

(58) Field of Classification Search
None
See application file for complete search history.

(56) References Cited

U.S. PATENT DOCUMENTS

| | | | |
|---|---|---|---|
| 891,888 | A | 6/1908 | Weiler |
| 5,745,714 | A | 4/1998 | Glass |

(Continued)

FOREIGN PATENT DOCUMENTS

| | | |
|---|---|---|
| EP | 3770787 | 1/2021 |
| EP | 4530909 | 4/2025 |

OTHER PUBLICATIONS

USPTO, Notice of Allowance for U.S. Appl. No. 16/521,179, mailed Nov. 20, 2019.

(Continued)

*Primary Examiner* — Sanchit K Sarker

(74) *Attorney, Agent, or Firm* — Faegre Drinker Biddle & Reath LLP

(57) ABSTRACT

An example method of enforcing granular access policy for embedded artifacts comprises: detecting an association of an embedded artifact with a resource container; associating the embedded artifact with at least a subset of an access control policy associated with the resource container; and responsive to receiving an access request to access the embedded artifact, applying the access control policy associated with the resource container for determining whether the access request is grantable.

17 Claims, 14 Drawing Sheets

Related U.S. Application Data continuation of application No. 16/803,104, filed on Feb. 27, 2020, now Pat. No. 11,089,029, which is a continuation of application No. 16/521,179, filed on Jul. 24, 2019, now Pat. No. 10,609,041.

(56) References Cited

U.S. PATENT DOCUMENTS

| | | | |
|---|---|---|---|
| 6,859,805 B1 | 2/2005 | Rogers | |
| 8,245,271 B2 | 8/2012 | Chan | |
| 8,447,829 B1 | 5/2013 | Geller | |
| 8,533,851 B2 | 9/2013 | Ginter | |
| 8,745,128 B2 | 6/2014 | Kazerani | |
| 8,813,170 B2 * | 8/2014 | Novak | G06Q 10/04 |
| | | | 702/183 |
| 8,918,818 B2 | 12/2014 | DeWeese | |
| 9,111,108 B2 | 8/2015 | Levenshteyn | |
| 9,116,917 B1 | 8/2015 | Ekwall | |
| 9,185,147 B1 | 11/2015 | Keel | |
| 9,274,907 B1 | 3/2016 | Bachu | |
| 9,342,852 B1 | 5/2016 | Nagaraj | |
| 9,471,798 B2 | 10/2016 | Vepa | |
| 9,516,028 B1 * | 12/2016 | Andruschuk | H04L 63/101 |
| 9,712,466 B2 | 7/2017 | Cohen | |
| 9,846,859 B1 | 12/2017 | Casale | |
| 9,870,484 B2 | 1/2018 | Bellert | |
| 10,140,739 B1 | 11/2018 | Burgin | |
| 10,146,960 B1 | 12/2018 | Wilczynski | |
| 10,235,533 B1 | 3/2019 | Thoren | |
| 10,250,401 B1 | 4/2019 | Skiff | |
| 10,609,041 B1 | 3/2020 | Wilczynski | |
| 2002/0035593 A1 | 3/2002 | Salim | |
| 2004/0139330 A1 | 7/2004 | Baar | |
| 2005/0055327 A1 | 3/2005 | Agrawal | |
| 2006/0053380 A1 | 3/2006 | Spataro | |
| 2006/0265394 A1 | 11/2006 | Raman | |
| 2006/0265395 A1 | 11/2006 | Raman | |
| 2007/0174399 A1 | 7/2007 | Ogle et al. | |
| 2007/0219979 A1 | 9/2007 | Jung | |
| 2008/0222083 A1 | 9/2008 | Lim | |
| 2008/0307498 A1 | 12/2008 | Johnson | |
| 2009/0012987 A1 * | 1/2009 | Kaminsky | G06F 21/6218 |
| | | | 707/999.102 |
| 2009/0049509 A1 * | 2/2009 | Chan | G06F 21/604 |
| | | | 726/1 |
| 2009/0198698 A1 | 8/2009 | Bahrs | |
| 2009/0217344 A1 | 8/2009 | Bellwood | |
| 2009/0327294 A1 | 12/2009 | Bailor | |
| 2010/0070461 A1 | 3/2010 | Vella | |
| 2010/0071031 A1 * | 3/2010 | Carter | G06F 21/32 |
| | | | 726/2 |
| 2010/0169268 A1 | 7/2010 | John | |
| 2010/0229246 A1 | 9/2010 | Warrington | |
| 2011/0066606 A1 | 3/2011 | Fox | |
| 2011/0265177 A1 | 10/2011 | Sokolan et al. | |
| 2011/0276903 A1 | 11/2011 | Mehin | |
| 2012/0159296 A1 | 6/2012 | Rebstock | |
| 2012/0198559 A1 | 8/2012 | Venkata Naga Ravi | |
| 2012/0209899 A1 | 8/2012 | Daenen | |
| 2012/0331568 A1 | 12/2012 | Weinstein | |
| 2013/0007895 A1 | 1/2013 | Brolley | |
| 2013/0097688 A1 | 4/2013 | Bradley | |
| 2013/0120369 A1 | 5/2013 | Miller | |
| 2014/0026072 A1 | 1/2014 | Beaven | |
| 2014/0089379 A1 | 3/2014 | Davis | |
| 2014/0250534 A1 | 9/2014 | Flores | |
| 2014/0280952 A1 | 9/2014 | Shear | |
| 2014/0380404 A1 | 12/2014 | Raj | |
| 2015/0067330 A1 | 3/2015 | Khan | |
| 2015/0089663 A1 | 3/2015 | Gile | |
| 2015/0143549 A1 | 5/2015 | Laitkorpi | |
| 2015/0178516 A1 | 6/2015 | Mityagin | |
| 2015/0242629 A1 | 8/2015 | Lindo | |
| 2015/0319111 A1 | 11/2015 | Carino | |
| 2015/0350251 A1 | 12/2015 | Brander | |
| 2015/0358306 A1 | 12/2015 | Adams | |
| 2016/0036872 A1 | 2/2016 | Lappin | |
| 2016/0080510 A1 | 3/2016 | Dawoud Shenouda Dawoud | |
| 2016/0100019 A1 | 4/2016 | Leondires | |
| 2016/0321469 A1 | 11/2016 | Bhogal | |
| 2016/0337291 A1 | 11/2016 | Park | |
| 2016/0342786 A1 | 11/2016 | Gerebe | |
| 2016/0366188 A1 | 12/2016 | Smith | |
| 2016/0378999 A1 | 12/2016 | Panchapakesan | |
| 2017/0180346 A1 | 6/2017 | Suarez | |
| 2017/0270283 A1 | 9/2017 | Shiraishi | |
| 2017/0346828 A1 | 11/2017 | Lorensson | |
| 2018/0033072 A1 | 2/2018 | Karthikeyan | |
| 2019/0073484 A1 | 3/2019 | Wilczynski | |
| 2019/0171837 A1 | 6/2019 | Thoren | |
| 2019/0182062 A1 | 6/2019 | Skiff | |
| 2023/0093504 A1 | 3/2023 | Wilczynski | |

OTHER PUBLICATIONS

USPTO, Notice of Allowance for U.S. Appl. No. 16/803,104, mailed Mar. 29, 2021.

USPTO, Nolice of Allowance for U.S. Appl. No. 17/386,060, mailed Aug. 25, 2022.

Cameron H. Malin, et al., 2012, Embedded Artifact, https://www.sciencedirect:com/topics/computer-science/embedded-artifact, pp. 1-0.

NIST, Dec. 13, 2016, https://web.archive.org/web/20161213215317/https://nvd.nist.gov/download/800-53/800-53-controls.xml, Govemors State Universtiy, pp. 1-64.

Harvard, Dec. 2015, Manage Access Requests in SharePoint, https://web.archive.org/web/20151214135632/ https://mso.harvard.edu/sp_access_requests, pp. 1-3.

Sergio Vincent Senese, Spring 2015, https://opus.govst.edu/cgi/viewcontent.cgi?referer-&htlpsredir=1&article=1056&context=theses, Governors State University, pp. 1-64.

Jana Rosero; et al., Granular: An access control model, and Confia: Its software tool, Sep. 2014, 2014 XL Latin American Computing Converence (CLEI), pp. 1-9.

Bertino et al: "Access Control Systems for Geospatial Data and Applications" In: "Spatial Data on the Web", Jan. 1, 2007, Springer Berlin Heidelberg, Berlin, Heidelberg; ISBN: 978-3-540-69877-7, pp. 189214.

The extended European search report for EP Application No. EP20187538.2, mailed on Nov. 24, 2020, 8 pages.

Official Communication for European Patent Application No. 18209228.8 dated Jan. 22, 2019.

Lin et al.: "Analysis of Access Control Mechanisms for Spacial Database", Jan. 1, 2008, <P055514572, Retrieved from the Internet: URL: http:/citeseerx.ist.psu.edu/viewdoc/download?oi=10.1.1.184.3608&rep=repl&type=pdf, [retrieved on Oct. 11, 2018].

Official Communication for U.S. Appl. No. 15/940,744 dated Jun. 29, 2018.

Official Communication for U.S. Appl. No. 15/826,441 dated Feb. 27, 2018.

Official Communication for European Patent Application No. 18173063.1 dated Oct. 23, 2018.

Official Communication for U.S. Appl. No. 15/829,654 dated Apr. 19, 2018.

Notice of Allowance for U.S. Appl. No. 16/183,267 dated Aug. 28, 2019.

* cited by examiner

600

1210 Create copy of access control policy of embedded artifact

1220 Associate embedded artifact with copy of access control policy

1230 Disassociate embedded artifact from container

1300

1310 Create restrictive version of access control policy of embedded artifact

1320 Associate embedded artifact with restrictive version of access control policy 1330 Redact one or more parts of embedded artifact based on restrictive version 1340 Share embedded artifact with one or more users

ENFORCING GRANULAR ACCESS CONTROL POLICY

RELATED APPLICATIONS

This application is a continuation of U.S. application Ser. No. 18/238,871, filed Aug. 28, 2023, which is a continuation of U.S. patent application Ser. No. 17/992,737, filed on Nov. 22, 2022, which is a divisional of U.S. patent application Ser. No. 17/386,060, filed on Jul. 27, 2021, issued as U.S. Pat. No. 11,558,393, which is a continuation of U.S. patent application Ser. No. 16/803,104, filed on Feb. 27, 2020, issued as U.S. Pat. No. 11,089,029, which is a continuation of U.S. patent application Ser. No. 16/521,179, filed on Jul. 24, 2019, issued as U.S. Pat. No. 10,609,041. The above-referenced applications are incorporated by reference herein in their respective entireties.

TECHNICAL FIELD

This disclosure is related to resource access control, and in particular to enforcing granular access control policies.

BACKGROUND

A security policy adopted by an organization may require restricting users' access to various documents, software programs, etc. The organization may implement the security policy by imposing access control policies with respect to various computing resources, such as folders, data and executable files, databases, libraries, etc.

BRIEF DESCRIPTION OF THE DRAWINGS

The present disclosure will be understood more fully from the detailed description given below and from the accompanying drawings of various implementations thereof, which, however, should not be taken to limit the present disclosure to the specific implementations, but are for explanation and understanding only.

DETAILED DESCRIPTION

The following description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Aspects of the present disclosure are directed to enforcing granular access control policies. In an illustrative example, an access control policy associated with one or more computing resources ("artifacts") may include one or more access control rules, such that each access control rule specifies an actor (e.g., a user or a user group) and an action which the specified actor is authorized to perform with respect to the computing resources.

While implementing access control with respect to common types of computing resources, such as files, folders, databases, libraries, etc., conventional resource access control methods typically offer no specific support for composite computing resources, such as computing resources that are embedded into resource containers or computing resources having multi-part structure, in which every part of a resource may require a distinct set of access control rules and/or a set of access control rules that depends on access control policies associated with other parts of the composite resource and/or access control policies associated with related resources.

Aspects of the present disclosure address the above-noted and other deficiencies of conventional access control methods by providing granular access control policies suitable for heterogeneous computing resources, such as composite computing resources, as well as providing access control policies that explicitly depend upon access control policies of related computing resources. Access control methods of the present disclosure may associate, with an artifact, an access control policy that includes a set of access control rules specifying the actions that may be performed with respect to the artifact by certain actors (e.g., users and/or user groups). For example, an access control rule may specify a user group and an action that the members of that user group are authorized to perform with respect to the artifact.

Figure 6:
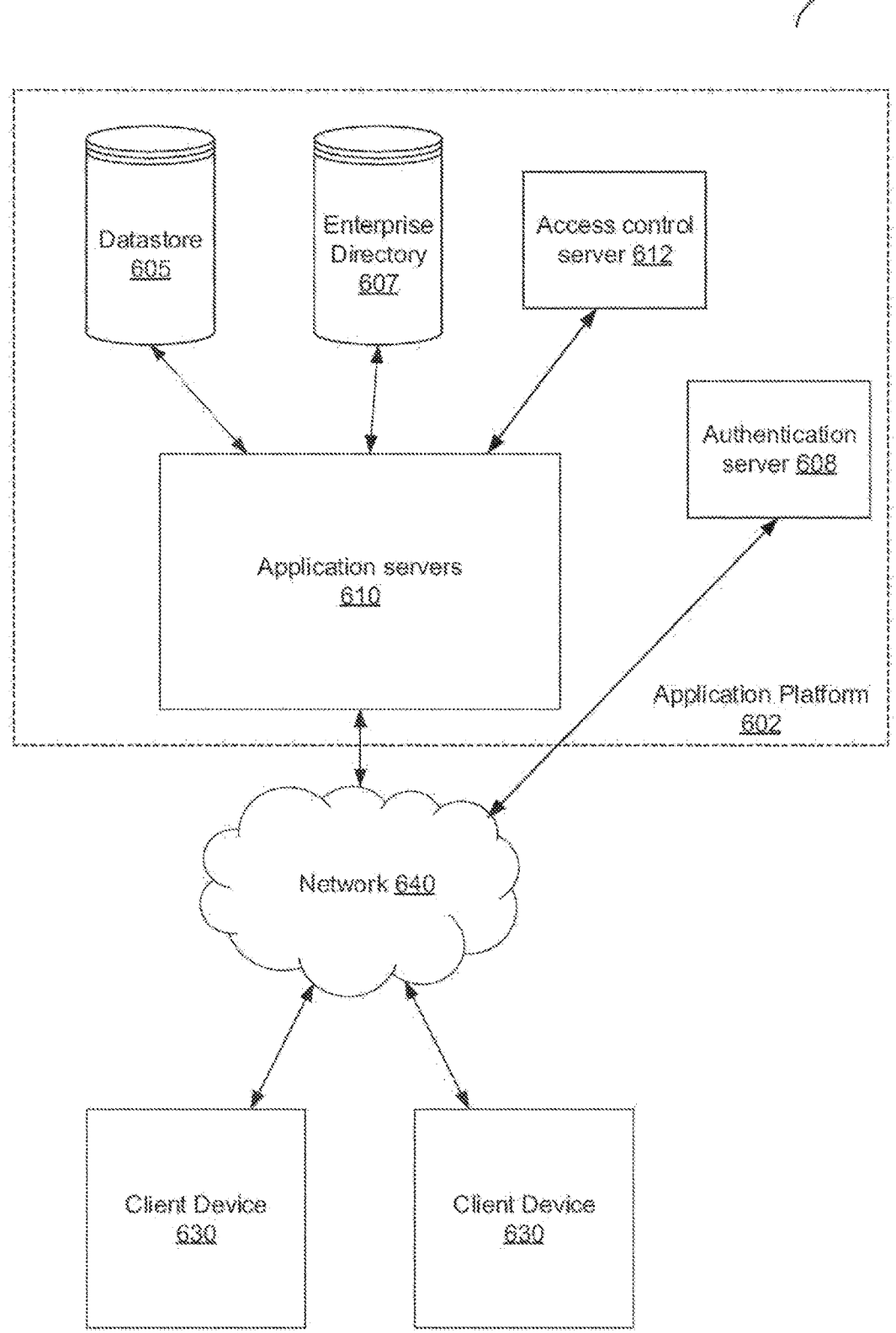
FIG. 6 is a block diagram illustrating a distributed computing system in which the systems and method described herein may operate.

Various applications, such as applications hosted by the application platform 602 of FIG. 6, may employ composite computing resources, also referred to as "resource containers" herein. A resource container is a resource that incorporates (including incorporation by reference) other resources. Such incorporated resources are referred to as "embedded resources" or "embedded artifacts" herein. For example, a container may be represented by a project (such as an investigation), while the investigation data items (e.g., investigation state information and the associated graphs and maps) may be referred to as the embedded objects. The relationship between a resource container and its embedded resources may, for illustrative purposes, be referred to herein as a "parent-child" relationship.

A container, like any other resource, may be associated with an access control policy. In some implementations, an embedded artifact may inherit the access control policy of the corresponding resource container. For example, the inheritance mechanism may be implemented by initializing the access control policy identifier of an embedded artifact to reference the access control policy of its container. Thus, when the container's access control policy changes, the embedded artifact's access control policy would change automatically, unless the parent-child relationship is explicitly destroyed (e.g., by performing an operation that removes the embedded artifact from the container).

In some implementations, the access control policy of the container may be further restricted for an embedded artifact. In other words, the access control policy of an embedded artifact may be the same or more restrictive than the access control policy of its container. For example, the restricted version of the access control policy of the container may be implemented by the embedded artifact referencing a subset of the access control policy of the container, rather than full access control policy of the container.

A new artifact created within a container may automatically inherit the access control policy of the container. Conversely, when an existing artifact is copied or moved into a container, the artifact's access control policy may be modified to comply with the access control policy of the container, in order to satisfy the general rule requiring that the access control policy of an embedded artifact be the same or more restrictive than the access control policy of its container. The resulting access control policy of the embedded artifact may be represented by a subset of the access control policy of the container, such that the subset is equal to the intersection of the access control policy of the container and the initial (pre-embedded) access control policy of the artifact. The access control policy identifier of the embedded artifact may be modified to reference the subset of the access control policy of the container.

An embedded artifact may in turn act as a container with respect to one or more artifacts, thus yielding a multi-level nested container structure. In such a structure, the access control policy of the inner (embedded) container may be the same or more restrictive than that of the outer container, while the access control policy of the artifacts embedded by the inner container may be the same or more restrictive than that of the inner (embedded) container.

In some implementations, an artifact (such as a container or an embedded artifact) may have a multi-part structure (e.g., a map may include multiple layers), in which at least one part is associated with an access control policy that is more restrictive than the access control policy of the other parts of the artifact, thus simulating a paper document with one or more "tear lines" that divide the document into two or more parts with different security classifications. For an embedded artifact having a multi-part structure, at least one part may be associated with an access control policy that is more restrictive than the access control policy of the other parts of the embedded artifact (and, therefore, is more restrictive than the access control policy of the container hosting the embedded artifact).

When a multi-part artifact is shared with a user, some portions of the artifact may be automatically redacted based on the user's associations with one or more user groups and applicable access control policies. For example, if an access control policy requires that a user be a member of the user group $G_1$ in order to access one part of the artifact and a member of the user groups $G_1$ and $G_2$ in order to access another part of the artifact, a user who is only a member of the user group $G_1$ shall be granted access to the first part of the artifact but not the second part of the artifact (i.e., the user is denied access to the second part of the artifact).

As noted above, the parent-child relationship of an embedded artifact and its container may be explicitly destroyed (e.g., by performing an operation that removes the embedded artifact from the container). Destroying the parent-child relationship may result in creating a copy of at least a subset of the access control policy of the container and associating the copy with the artifact. Accordingly, upon destroying the parent-child relationship, the artifact's access control policy may no longer track the changes of the container's access control policy.

As noted above, various conventional access control methods are designed for providing object-level security, and thus may not be adaptable for composite resources, such as embedded artifacts, including the embedded artifacts having a multi-part structure, described herein. Conversely, the systems and methods described herein overcome various deficiencies of conventional access control methods by providing granular access control policies which are suitable for embedded artifacts and artifacts having a multi-part structure, and thus improve the functioning of various computing systems, as described in more detail herein below.

The methods described herein may be implemented by hardware (e.g., general purpose and/or specialized processing devices, and/or other devices and associated circuitry), software (e.g., instructions executable by a processing device), or a combination thereof.

Figure 1:
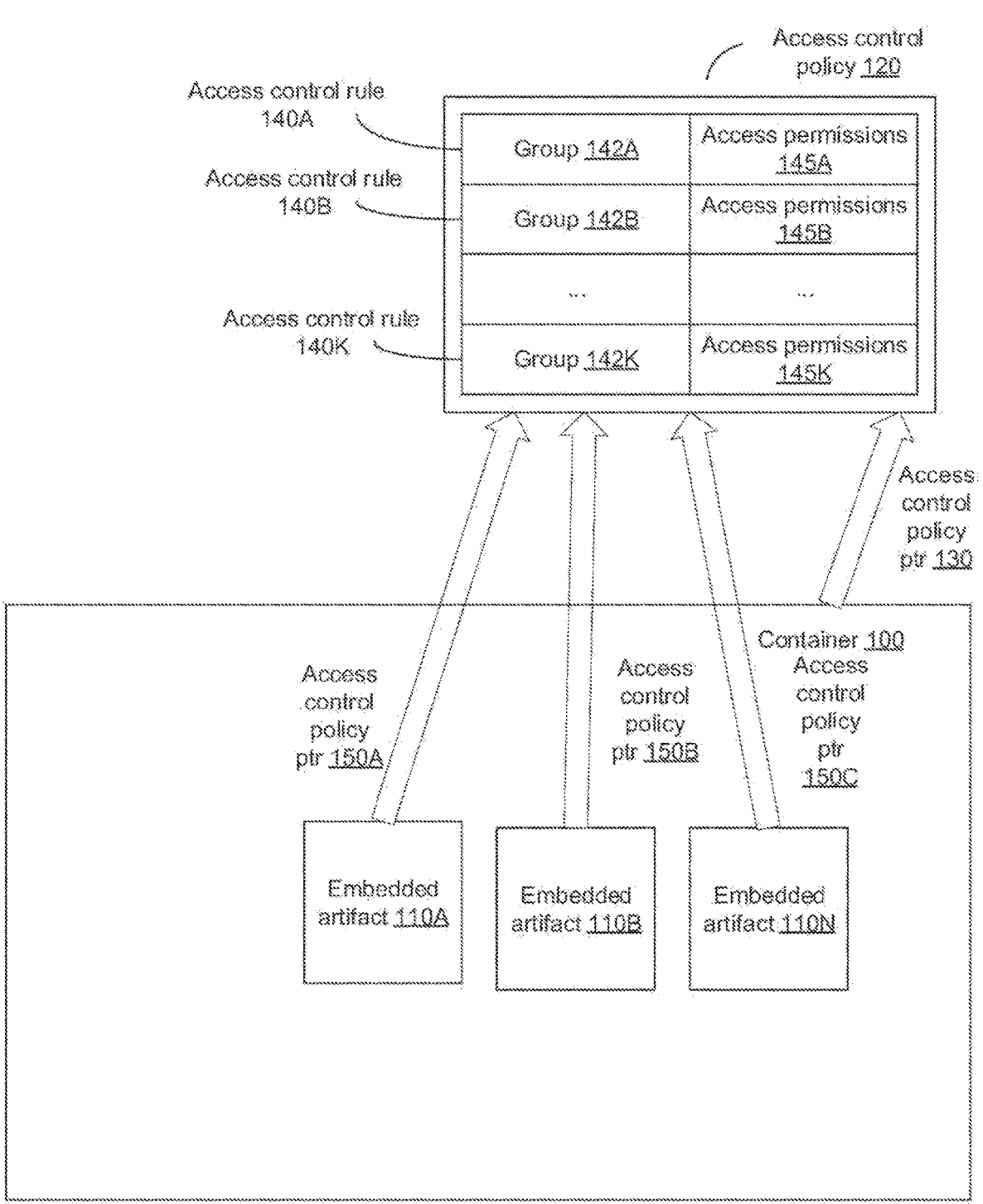
FIG. 1 schematically illustrates an example composite resource including a container and its embedded artifacts, implemented in accordance with one or more aspects of the present disclosure.

FIG. 1 schematically illustrates an example composite resource including a container and its embedded artifacts, implemented in accordance with one or more aspects of the present disclosure. As shown in FIG. 1, container 100 may host one or more embedded artifacts 110A-110N. Container 100 may be associated, by access control policy pointer 130, with access control policy 120. Access control policy pointer 130 may be stored in the metadata of container 100.

Access control policy 120 may include the default access control rule that denies all types of access to all users, and may further include one or more access control rules 140A-140K, such that each access control rule 140 includes an identifier of a user group 142 and a corresponding set of access permissions 145, thus indicating that a member of user group 142 is authorized to perform, with respect to one or more resources associated with access control policy 120, the actions identified by access permissions 145. For example, such actions may include reading the resource, writing to the resource, executing the resource, and/or deleting the resource.

As noted above, an embedded artifact may inherit the access control policy of its container. Thus, in the illustrative example of FIG. 1, each of embedded artifacts 110A-110N inherits access control policy 120 of container 100. The association of an embedded artifact 110 with access control policy 120 of container 100 may be expressed by the corresponding access control policy pointer 150, which may be a part of the metadata of the embedded artifact 110. Changes to access control policy 120 of container 100 may be automatically tracked by respective access control policies of embedded artifacts 110A-110N, unless the parent-child relationship is explicitly destroyed for one or more embedded artifacts 110A-110N. The parent-child association of an embedded artifact 110 and container 100 may be destroyed by moving the embedded artifact 110 out of container 100 (e.g., to another container).

Figure 2:
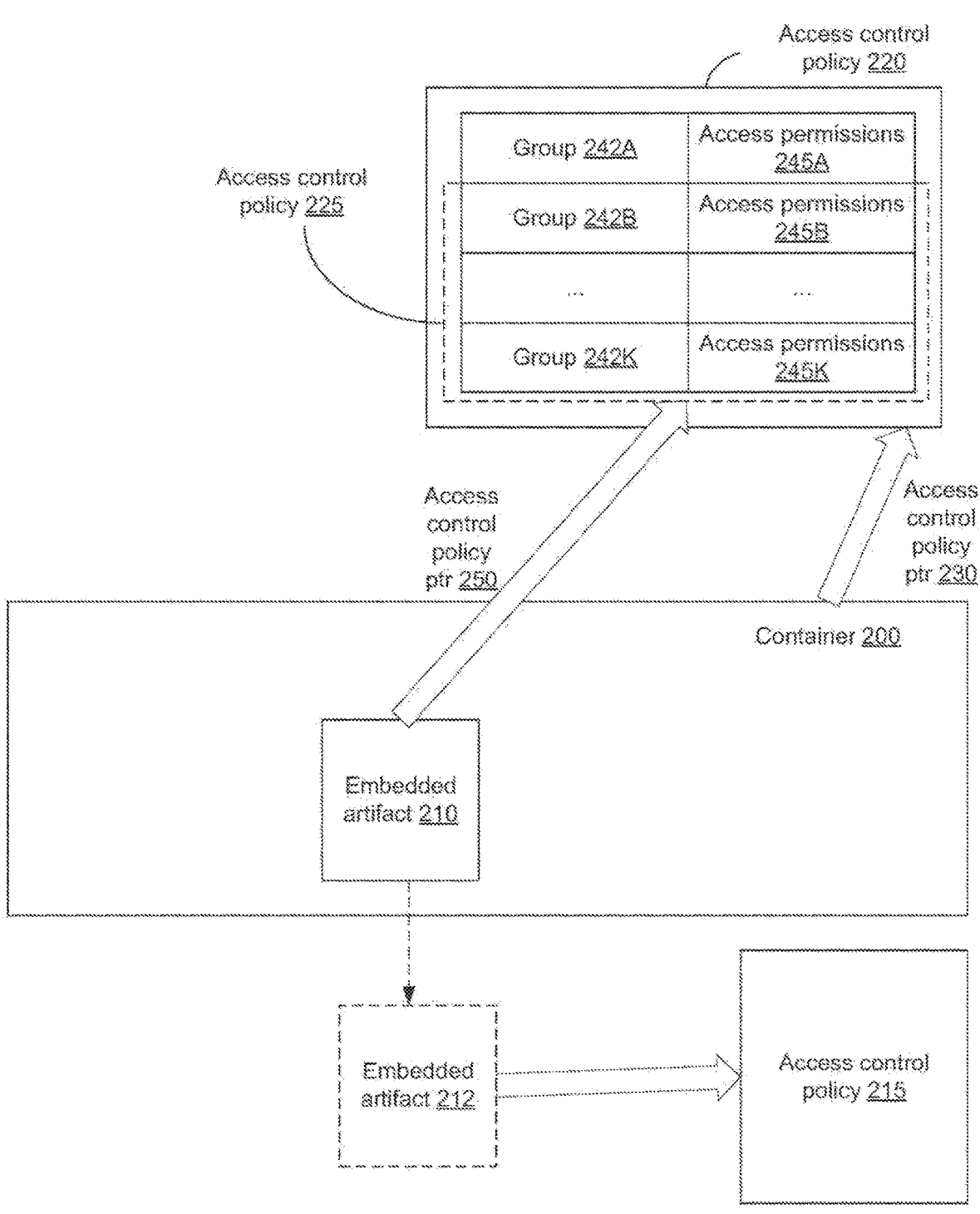
FIG. 2 schematically illustrates an example of restricting the container's access control policy for its embedded artifact, in accordance with one or more aspects of the present disclosure.

As noted above, the access control policy of an embedded artifact 110 may be the same or more restrictive than the access control policy of its container 100. FIG. 2 schematically illustrates an example of restricting the container's access control policy for its embedded artifact, in accordance with one or more aspects of the present disclosure. The restricted version of the access control policy of the container may be implemented by embedded artifact 210 referencing, by its access control policy pointer 250, a subset 225 of access control policy 220 of container 200. Similarly to the example of FIG. 1, container 200, which hosts embedded artifact 210, is associated, by access control policy pointer 230, with access control policy 220. The latter includes one or more access control rules, such that each access control rule includes an identifier of a user group 242 and a corresponding set of access permissions 245, thus indicating that a member of the user group 242 is authorized to perform, with respect to one or more resources associated with access control policy 220, the actions identified by access permissions 245.

In an illustrative example, embedded artifact 210 may need to be shared with one or more users whose group affiliations do not allow them to access the whole content of embedded artifact 210 based on the access control policy 225. In order to share embedded artifact 210 with such users, a restrictive version 215 of access control policy 225 may be created. For example, the restrictive version 215 of the access control policy 225 may be represented by a subset of the access control policy 225, such that the subset only includes the access control rules that reference one or more user groups of the user with whom the embedded artifact is to be shared, thus ensuring that the target user population would in fact have the requisite access rights. One or more parts of embedded artifact 210 may be redacted based on the restrictive version 215 of access control policy 225, thus producing embedded artifact 212. For example, the parts that are redacted may include the parts that are associated with one or more access control rules that are present in the access control policy 225, but were removed from the restrictive version 215 of the access control policy 225. Upon associating embedded artifact 212 with the restrictive version 215 of access control policy 225, embedded artifact 212 may be shared with one or more users that are authorized to access the embedded artifact based on the restrictive version 215 of access control policy 225.

Figure 3:
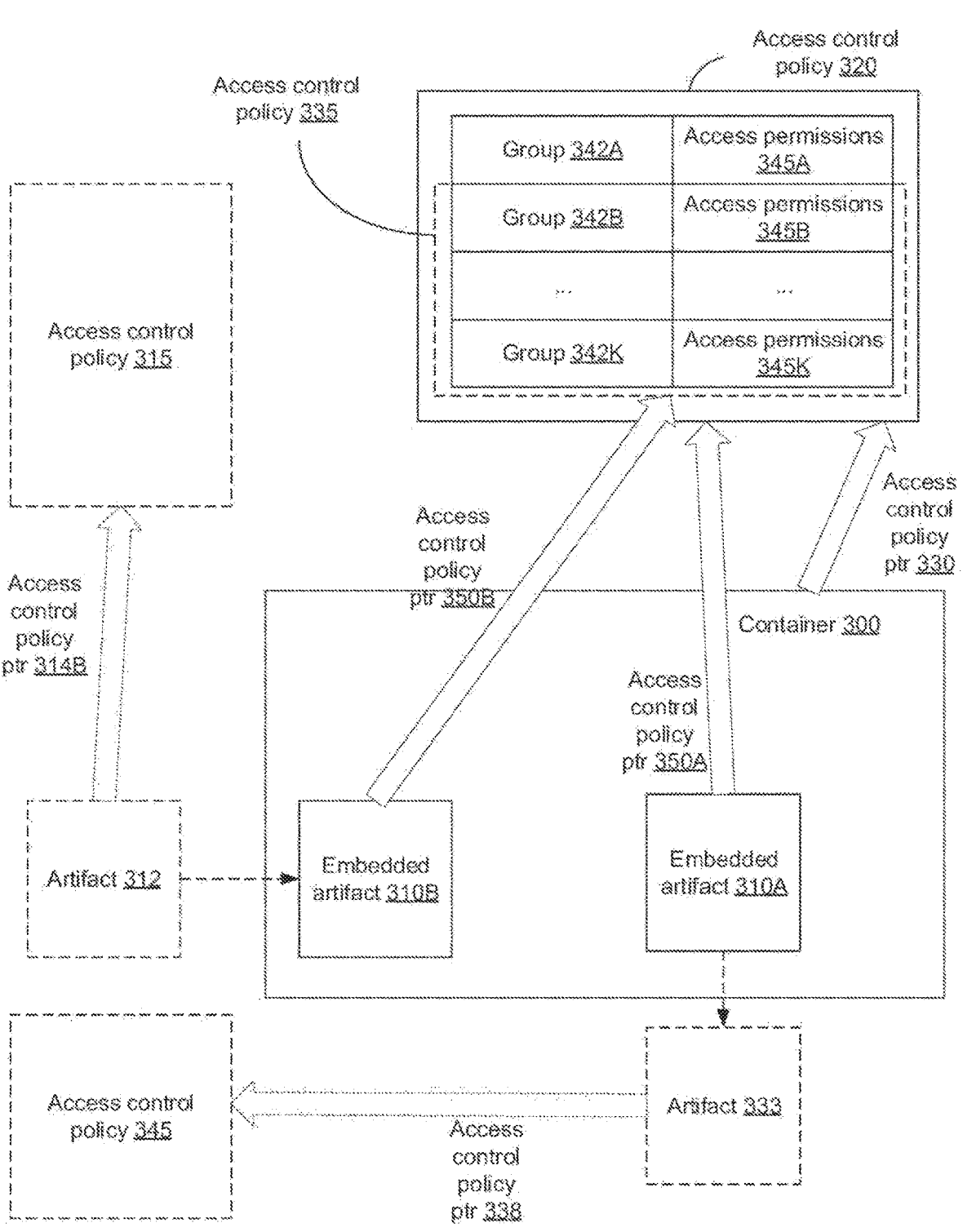
FIG. 3 schematically illustrates an example of modifying access control policy of an artifact upon its association with a container, in accordance with one or more aspects of the present disclosure.

FIG. 3 schematically illustrates an example of modifying access control policy of an artifact upon its association with a container, in accordance with one or more aspects of the present disclosure. As shown, a new artifact 310A created within container 300 automatically inherits access control policy 320 of container 300 (e.g., by initializing access control policy pointer 350 of embedded artifact 310A to reference access control policy 320 of container 300). Conversely, when an existing artifact 312 is copied or moved into container 300, thus becoming embedded artifact 310B, access control policy 315 that was previously associated with artifact 312 (e.g., by access control policy pointer 314) is modified to comply with access control policy 320 of container 300, in order to satisfy the general rule requiring that the access control policy of an embedded artifact be the same or more restrictive than the access control policy of its container. In the illustrative example of FIG. 3, such a modification involves identifying a subset 335 of access control policy 320 which is equal to the intersection of access control policy 320 and access control policy 315, and associating embedded artifact 310B with the identified subset 335 of access control policy 320 of container 300 (e.g., by pointer 350B referencing the identified subset of the access control policy of the container). Similarly to the example of FIG. 1, container 300, which hosts the embedded artifacts 310A-310B, is associated, by access control policy pointer 330, with access control policy 320. The latter includes one or more access control rules, such that each access control rule includes an identifier of a user group 342 and a corresponding set of access permissions 345, thus indicating that a member of user group 342 is authorized to perform, with respect to one or more resources associated with access control policy 320, the actions identified by access permissions 345.

As noted herein above, the parent-child association of an embedded artifact and its container may be explicitly destroyed (e.g., by performing an operation that removes the embedded artifact from the container). In the illustrative example of FIG. 3, the parent-child association of embedded artifact 310A and container 300 may be destroyed by moving embedded artifact 310A out of container 300, such that embedded artifact 310A would become artifact 333. Destroying the parent-child association may require creating a copy 345 of access control policy 320 of container 300 and associating, by access control policy pointer 338, the newly created access control policy 345 with artifact 333. Accordingly, upon destroying the parent-child association, the changes of the container's access control policy 320 would no longer be tracked by the access control policy of artifact 333.

Figure 4:
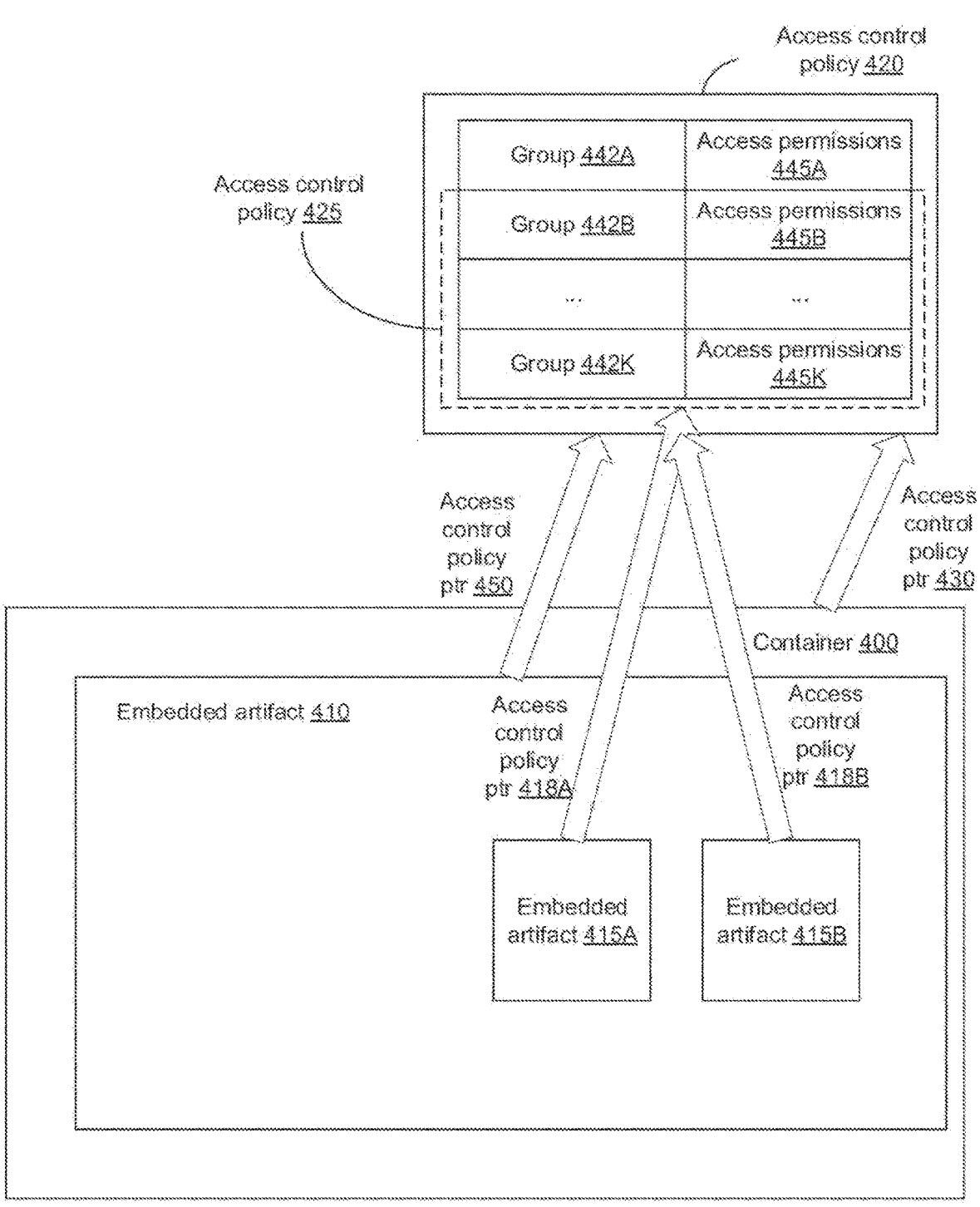
FIG. 4 schematically illustrates an example multi-level nested container structure implemented in accordance with one or more aspects of the present disclosure.

FIG. 4 schematically illustrates an example multi-level nested container structure implemented in accordance with one or more aspects of the present disclosure. As shown, embedded artifact 410 may act as a container with respect to one or more embedded artifacts 415A-415B, thus yielding a multi-level nested container structure. In such a structure, the access control policy of the inner (embedded) container may be the same or more restrictive than that of the outer container, while the access control policy of the artifacts embedded by the inner container may be the same or more restrictive than that of the inner (embedded) container. In the illustrative example of FIG. 4, outer container 400, which hosts inner container 410, is associated, by access control policy pointer 430, with access control policy 420. In turn, inner container 410, which hosts embedded artifacts 415A-415B, is associated, by access control policy pointer 450, with access control policy 420 of the container 410. Finally, embedded artifact 415A is associated, by access control policy pointer 418A, with access control policy 425, which represents a subset of access control policy 420 of outer container 410, while embedded artifact 415A, is associated, by access control policy pointer 418B, with access control policy 420 of outer container 410. Similarly to the illustrative example of FIG. 1, access control policy 420 includes one or more access control rules, such that each access control rule includes an identifier of a user group 442 and a corresponding set of access permissions 445, thus indicating that a member of user group 442 is authorized to perform, with respect to one or more resources associated with access control policy 420, the actions identified by access permissions 445.

Figure 5:
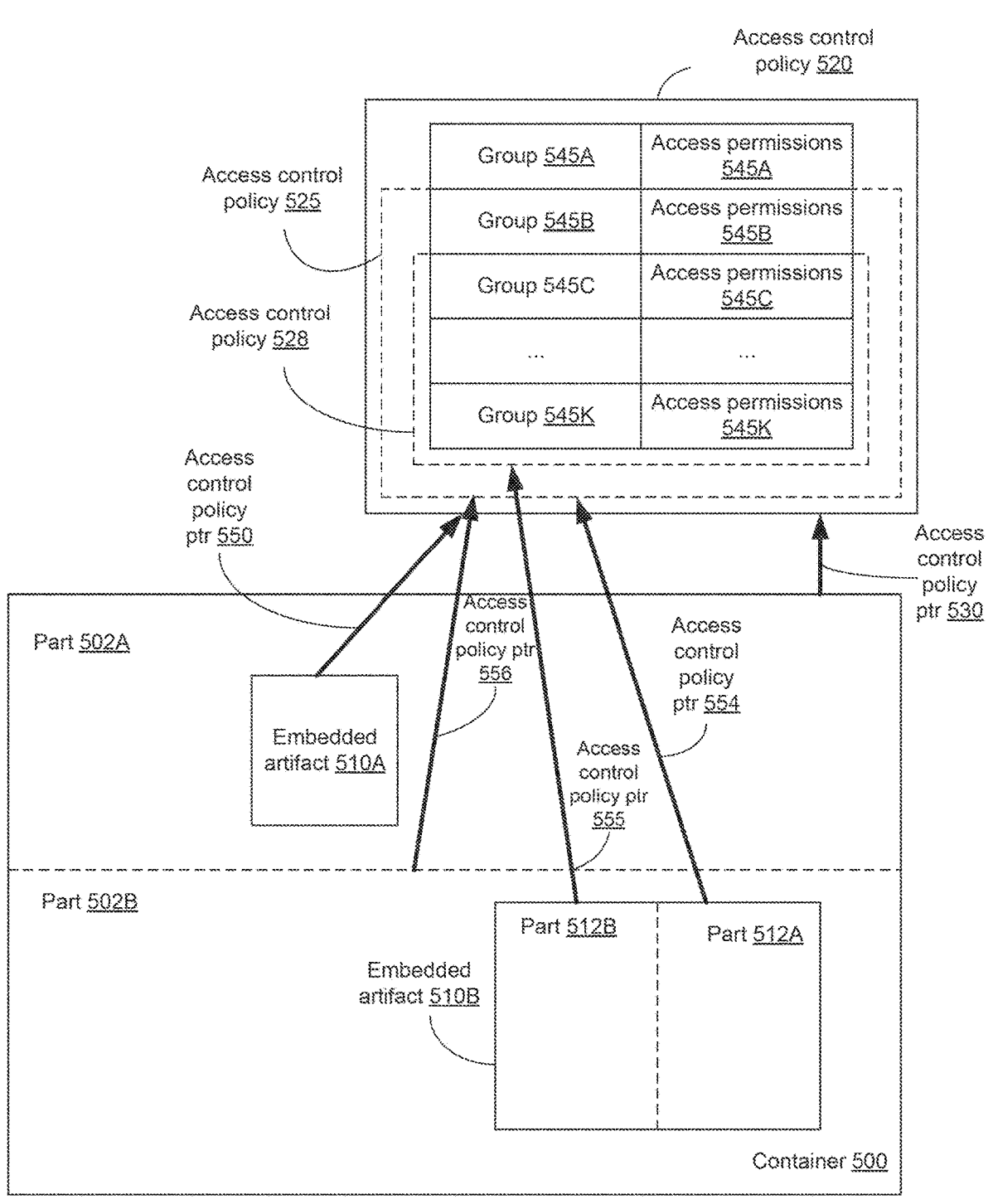
FIG. 5 schematically illustrates an example multi-part artifact structure implemented in accordance with one or more aspects of the present disclosure.

As noted above, an artifact (such as a container or an embedded artifact) may have a multi-part structure, in which at least one part is associated with an access control policy which is more restrictive than the access control policy of the other parts of the artifact, thus simulating a paper document with one or more "tear lines" that divide the document into two or more parts with different security classifications. Referring now to FIG. 5, which schematically illustrates an example multi-part artifact structure implemented in accordance with one or more aspects of the present disclosure, container 500 may host one or more embedded artifacts 510A-510B. Container 500 may be associated, by access control policy pointer 530, with access control policy 520.

Container 500 may include two or more parts 502A-502B, such that at least one part 502B is associated, by access control policy pointer 556, with a subset 525 of access control policy 520 of the container. Similarly to the illustrative example of FIG. 1, access control policy 520 includes one or more access control rules 540A-540K, such that each access control rule 540 includes an identifier of a user group 542 and a corresponding set of access permissions 545, thus indicating that a member of user group 542 is authorized to perform, with respect to one or more resources associated with access control policy 520, the actions identified by access permissions 545.

For an embedded artifact having a multi-part structure, at least one part is associated with an access control policy which is more restrictive than the access control policy of the other parts of the embedded artifact (and, therefore, is more restrictive than the access control policy of the container hosting the embedded artifact). Accordingly, embedded artifact 510B, which is hosted by part 502B of container 500, may include two or more parts 512A-512B, such that part 512B is associated, by access control policy pointer 555, with subset 528 of access control policy 525 of container part 502B, while part 512A is associated, by access control policy pointer 554, with access control policy 525 of container part 502B.

When a multi-part artifact is shared with a user, some portions of the artifact may be automatically redacted based on the user's associations with one or more user groups and applicable access control policies. Accordingly, in the illustrative example of FIG. 5, access control policy 525 associated with embedded artifact 510B requires that a user be a member of the user group $G_1$ in order to be granted read access to the artifact, while the more restrictive access control policy 528 requires that the user be a member of the user groups $G_1$ and $G_2$ in order to be granted read access to the restricted part 512A of artifact 510B. Therefore, a user who is only a member of the user group $G_1$ will be granted access to part 512A of artifact 510B, while access to part 512B of artifact 510B will be denied to the user.

FIG. 6 is a block diagram illustrating a distributed computing system in which the systems and method described herein may operate. Distributed computing system 600 may include one or more client devices 630 and an application platform 602, which may communicate with each other via network 640. Computer system 1400 of FIG. 14 may be one example of any of client devices 630 or a server(s) in the application platform 602. Network 640 may include, for example, the Internet, intranets, extranets, wide area networks (WANs), local area networks (LANs), wired networks, wireless networks, or other suitable networks, etc., or any combination of two or more such networks.

Client devices 630 may include computer systems embodied in the form of desktop computers, laptop computers, personal digital assistants, cellular telephones, smartphones, set-top boxes, music players, web pads, tablet computer systems, game consoles, electronic book readers, or other devices with similar capability.

Application platform 602 may include, for example, one or more server computers or any other system providing computing capability. Alternatively, application platform 602 may employ a plurality of computing devices that may be arranged, for example, in one or more clusters or other arrangements. Such computing devices may be positioned in a single location or may be distributed among many different geographical locations. For example, application platform 602 may include a plurality of computing devices that together may comprise a hosted computing resource, a grid computing resource and/or any other distributed computing arrangement. In some cases, application platform 602 may correspond to an elastic computing resource where the allotted capacity of processing, network, storage, or other computing-related resources may vary over time.

In some implementations, application platform 602 may include one or more application servers 610, datastore 605 storing the enterprise data, enterprise directory 607, authentication server 608, and access control server 612. Various other functional and/or infrastructure components, such as presentation layer servers, load balancers, firewalls, routers, switches, etc. are omitted from FIG. 6 for clarity and conciseness. Application servers 610 may be employed to deliver functionality of various business applications, as described in more detail herein below with reference to FIGS. 7-10.

Datastore 605 may include one or more mass storage devices which may include, for example, flash memory, magnetic or optical disks, or tape drives; read-only memory (ROM); random-access memory (RAM); erasable programmable memory (e.g., EPROM and EEPROM); flash memory; or any other type of storage medium. Datastore 605 may include structured and/or unstructured sets of data that may be divided/extracted for provisioning when needed by one or more components of application platform 602. Datastore 605 may include one or more datasets which may be stored in one or more databases, such as a relational database.

Enterprise directory 607 may be designed to provide distributed directory information services by querying an organized set of records representing various entities, including users, user groups, organizations, etc. In an illustrative example, enterprise directory 607 may include a set of user records, such that each record is uniquely identified by a user identifier and includes the user authentication credentials (or their derivative forms) and a list of user groups associated with the user. In some implementations, enterprise server 185 may implement Lightweight Directory Access Protocol (LDAP).

Authentication server 608 may perform user authentication based on the user credentials (e.g., a user identifier and a user password) supplied by the user via client device 630. In some implementations, responsive to successfully authenticating a user, authentication server 608 may issue a ticket that client device 630 may then present to access control server 612 in order to get access to one or more application servers 610. In some implementations, authentication server 608 may support multi-factor user authentication (e.g., based on the knowledge factor and the possession factor). While in some implementations, authentication server 608 and access control server 612 may implement Kerberos protocol, in other implementations, authentication server 608 and access control server 612 may implement another strong authentication protocol that facilitates acquiring authentication assertions and deriving secondary credentials for gaining access to specific applications. Access control server 612 may implement granular access control policies that are described in more detail above with reference to FIGS. 1-5.

In an illustrative example, client device 630 may prompt the user to supply the authentication credentials (e.g., a user identifier, a password, and a short-lived alphanumeric nonce) and may transmit an authentication request based on the user's input to authentication server 608. Responsive to successfully authenticating the user based on the authentication credentials, authentication server 608 may issue an authentication ticket, which may be presented, by client device 630, to access control server 612 in order to gain access to various resources of application platform 602. Access control server 612 may verify the user's entitlement to access the requested resource. In some implementations, the user's entitlement verification involves matching the groups associated with the user to the user groups specified by the access control policy that is associated with the requested resource. The resource may be represented by a resource container, an embedded resource, or a multi-part resource, as described in more detail herein above.

Responsive to determining that the access control policy allows the requesting access type (e.g., reading the resource, writing to the resource, executing the resource, and/or deleting the resource) to at least one user group associated with the user, access control server 612 may allow the user to access the requested resource; otherwise, the access request may be denied and an error message may be displayed to the user.

In some implementations, the user may choose to act based on a subset of their access rights, rather than the full set of rights. In some implementations, the user may select a subset of their user groups in order to gain access to the requested resource based on the access rights associated with the selected subset of user groups.

Figure 7:
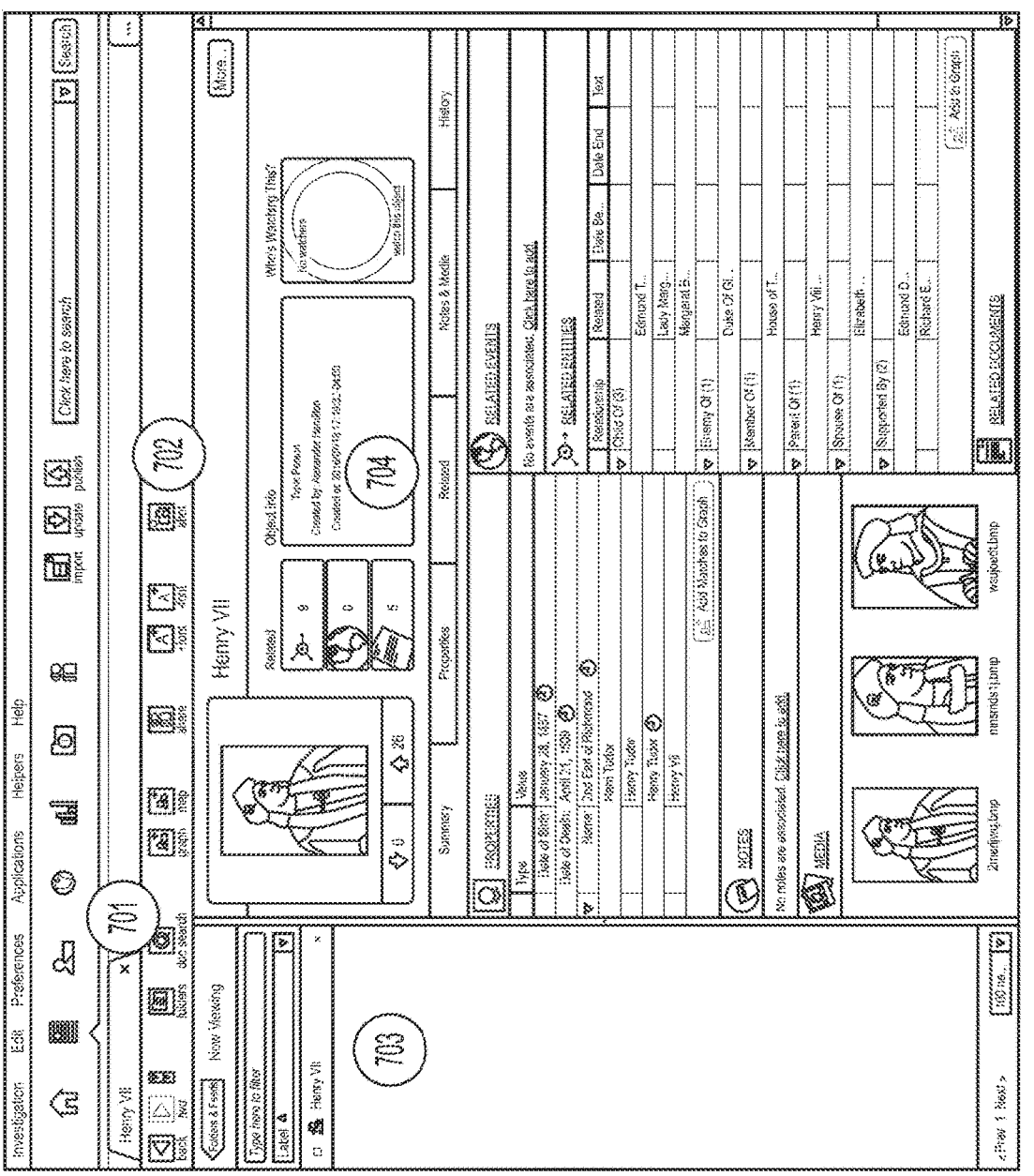
FIG. 7 schematically illustrates the main screen of the browser application which may be hosted by an application platform, in accordance with one or more aspects of the present disclosure.

FIG. 7 schematically illustrates the main screen of the browser application which may be hosted by application platform 602 of FIG. 6, in accordance with one or more aspects of the present disclosure. The browser application is a virtual dossier associated with one or more artifacts (e.g., projects, interactive maps, or any other sets of a hierarchically organized data object). The artifacts may include containers, embedded artifacts, and/or multi-part artifacts associated with granular access control policies, as described in more detail above with reference to FIGS. 1-5. The browser application may be used to view detailed information on one or more artifacts or their embedded objects, edit object properties, add notes, and view a history of changes that were made to the object. Additionally, the user may set up triggers and feeds to monitor changes or messages related to one or more objects. The browser application may include various graphical user interface (GUI) controls, e.g., browser tabs 701 for switching between artifacts (e.g., documents) and folders. The browser toolbar 702 may include various icons associated with tasks that may be performed in the artifacts. Browser panel 703 may include a list of objects in the currently selected folders. The browser subtabs 707 may be utilized to view and modify the currently selected objects.

Figure 8:
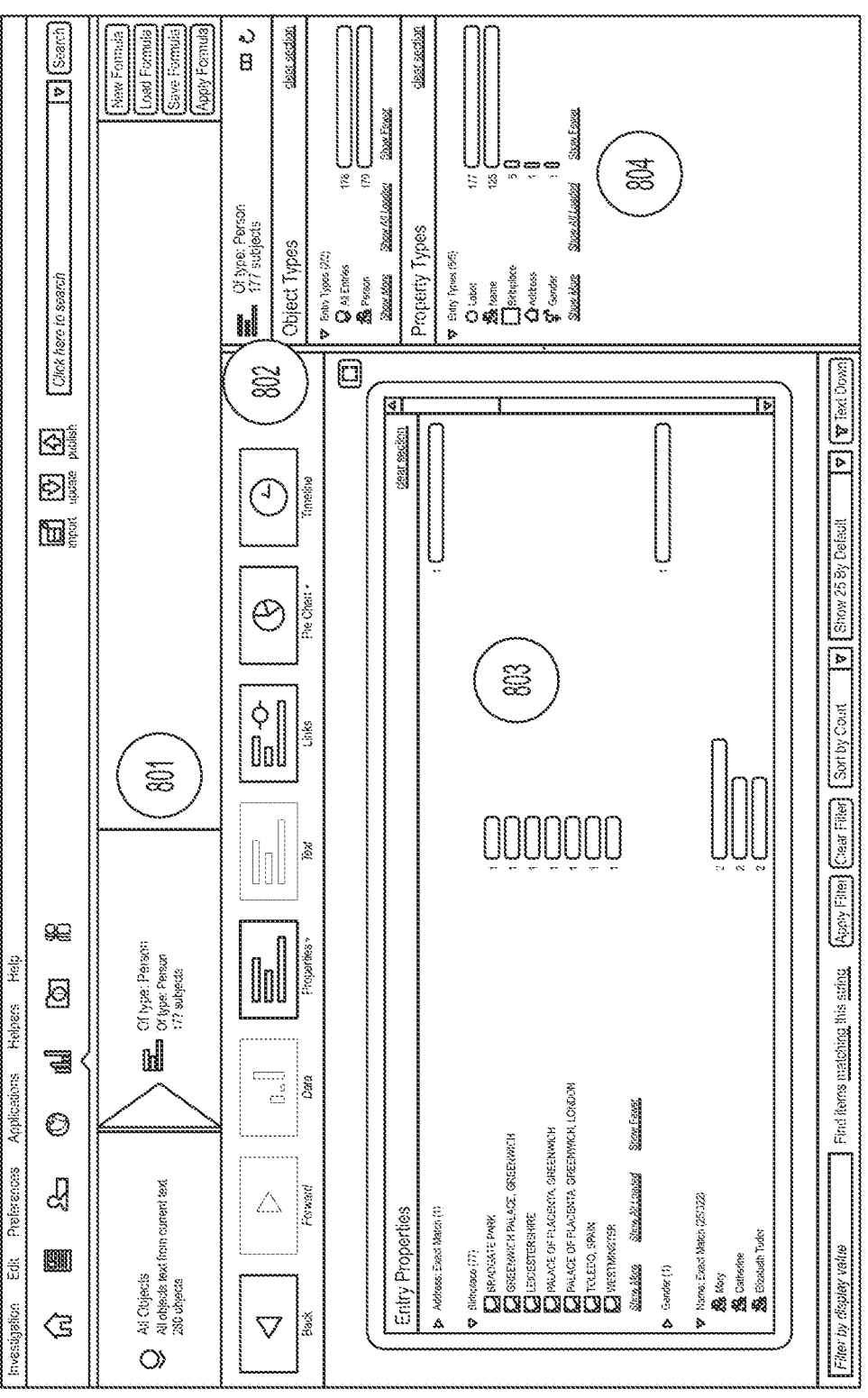
FIG. 8 schematically illustrates the main screen of the object explorer application which may be hosted by an application platform, in accordance with one or more aspects of the present disclosure.

FIG. 8 schematically illustrates the main screen of the object explorer application which may be hosted by application platform 602 of FIG. 6, in accordance with one or more aspects of the present disclosure. The object explorer application allows the user to view the entire data set, filter the data by using the visualization, and perform targeted actions on the resulting object. The objects of the data set may include containers, embedded artifacts, and/or multi-part artifacts associated with granular access control policies, as described in more detail above with reference to FIGS. 1-5. The object explorer application may include various graphical user interface (GUI) controls, e.g., the formula panel 801 for creating and working with formulas and object sets. The instrument panel 802 allows the user to specify display options for the visualization of the data set. The visualization panel 803 allows the user to review the selected objects. The preview panel 803 allows the user to derive new object sets and produce histograms from the selected data.

Figure 9:
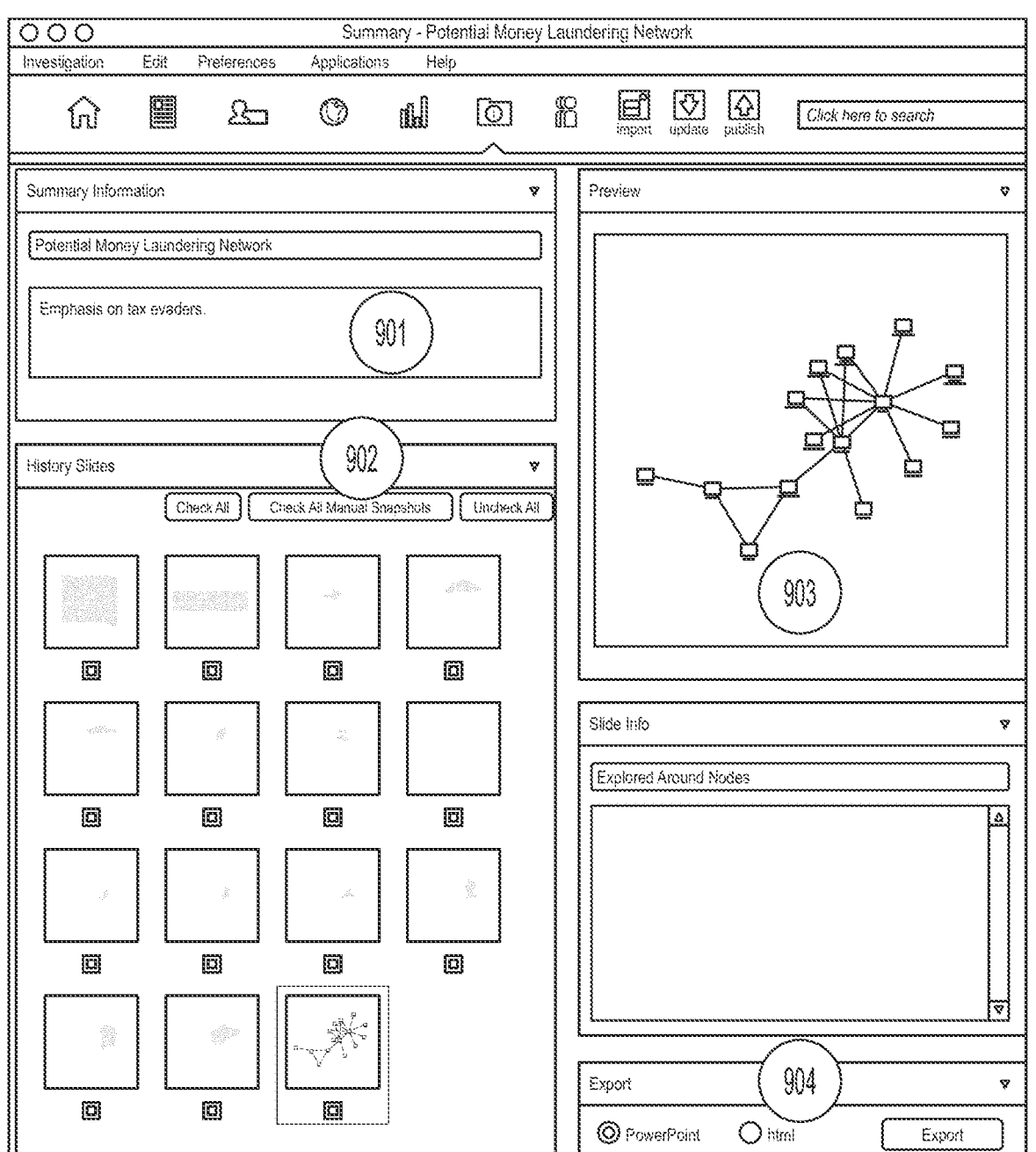
FIG. 9 schematically illustrates the main screen of the summary application which may be hosted by an application platform, in accordance with one or more aspects of the present disclosure.

FIG. 9 schematically illustrates the main screen of the summary application which may be hosted by application platform 602 of FIG. 6, in accordance with one or more aspects of the present disclosure. The summary application allows the user to prepare a presentation from a set of thumbnails that show actions in a project over time, select which history slides to include, specify a title and description of each slide, and save the presentation in a chosen format (e.g., HTML). The objects manipulated by the summary application may include containers, embedded artifacts, and/or multi-part artifacts associated with granular access control policies, as described in more detail above with reference to FIGS. 1-5. The summary application may include various graphical user interface (GUI) controls, e.g., the information summary panel 901 for modifying the project title and/or description. The history slides panel allows the user to select slide for export. The selected slides may be reviewed in the preview panel 903. The export button 904 activates exporting of the selected slide to a specified format.

Figure 10:
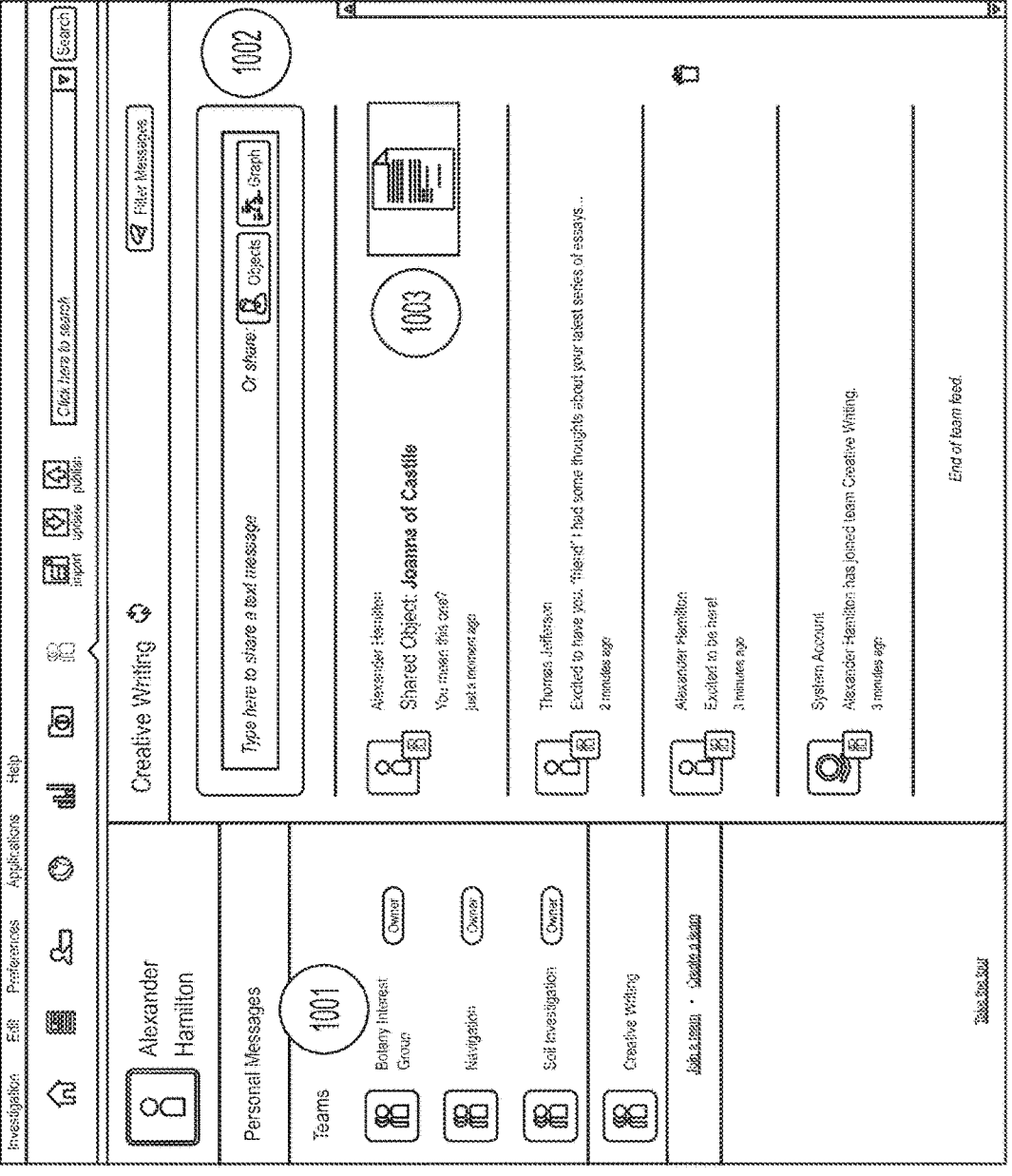
FIG. 10 schematically illustrates the main screen of the collaboration application which may be hosted by an application platform, in accordance with one or more aspects of the present disclosure.

FIG. 10 schematically illustrates the main screen of the collaboration application which may be hosted by application platform 602 of FIG. 6, in accordance with one or more aspects of the present disclosure. The collaboration application allows the user to build discussion communities, form teams, exchange messages, share media rich links to various objects, and send notifications of shared objects. The objects manipulated by the collaboration application may include containers, embedded artifacts, and/or multi-part artifacts associated with granular access control policies, as described in more detail above with reference to FIGS. 1-5. The collaboration application may include various graphical user interface (GUI) controls, e.g., the sidebar 1001 to create and manage teams, or select a team to view messages. The message panel 1002 allows the user to send messages to individual users or teams. The team message panel 1003 displays the team messages.

Figure 11:
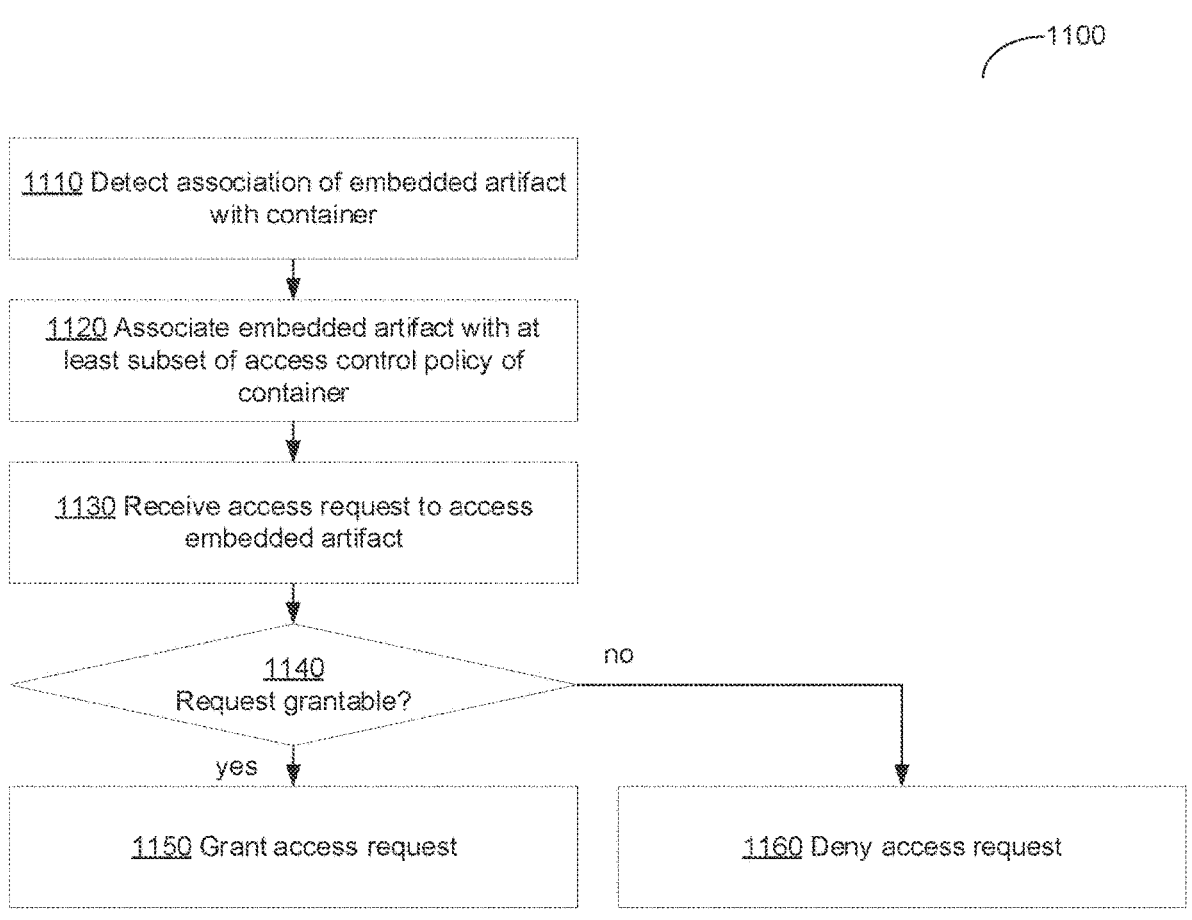
FIG. 11 depicts a flowchart of an example method of providing access control policy for embedded artifacts, in accordance with one or more aspects of the present disclosure.

FIG. 11 depicts a flowchart of an example method of providing access control policy for embedded artifacts, in accordance with one or more aspects of the present disclosure. Method 1100 and/or each of its individual functions, routines, subroutines, or operations may be performed by one or more processors of the computer system (e.g., the example computer system 1400 of FIG. 14) implementing the method. In certain implementations, method 1100 may be performed by a single processing thread. Alternatively, method 1100 may be performed by two or more processing threads, each thread executing one or more individual functions, routines, subroutines, or operations of the method. In an illustrative example, the processing threads implementing method 1100 may be synchronized (e.g., using semaphores, critical sections, and/or other thread synchronization mechanisms). Alternatively, the processing threads implementing method 1100 may be executed asynchronously with respect to each other.

At block 1110, a computer system implementing the method may detect an association of an embedded artifact with a resource container. For example, an existing artifact may be copied or moved into the resource container. In another example, a new artifact may be created within the resource container, as described in more detail above with references to FIGS. 1-5.

At block 1120, the computer system may associate the embedded artifact with at least a subset of the access control policy of the resource container. As noted above, the access control policy of the embedded artifact may be the same or more restrictive than the access control policy of its container. Accordingly, the restricted version of the access control policy of the container may be implemented as a subset of the access control policy of the container, as described in more detail above with references to FIGS. 1-5.

At block 1130, the computer system may receive an access request to access the embedded artifact. The access request may specify the identifier of the user that has initiated the access request and the type of access that is requested (e.g., reading the embedded artifact, writing to the embedded artifact, executing the embedded artifact, and/or deleting the embedded artifact) as described in more detail above with references to FIGS. 1-5.

At block 1140, the computer system may apply the access control policy associated with the resource container for determining whether the access request is grantable. For example, the computer system may query the user directory for a list of user groups associated with the user that initiated the access request. The computer system may then traverse the access control policy associated with the embedded artifact while attempting to match the user group of each access control rule of the access control policy to each of the user groups on the list of the user groups associated with the user that initiated the access request. Should a match be found, the computer system may determine whether the matching access control rule allows the type of access specified by the access request. If the type of access specified by the rule does matches the type of access specified by the access request, the computer system may, at block 1150, grant the access request; otherwise, the computer system may continue traversing the access control policy until a matching rule is found. If no matching rules are found, the computer system may, at block 1160, deny the access request, and the method may terminate.

Figure 12:
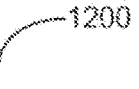
FIG. 12 depicts a flowchart of an example method of disassociating an embedded artifact from its container, in accordance with one or more aspects of the present disclosure.
Figure 12:
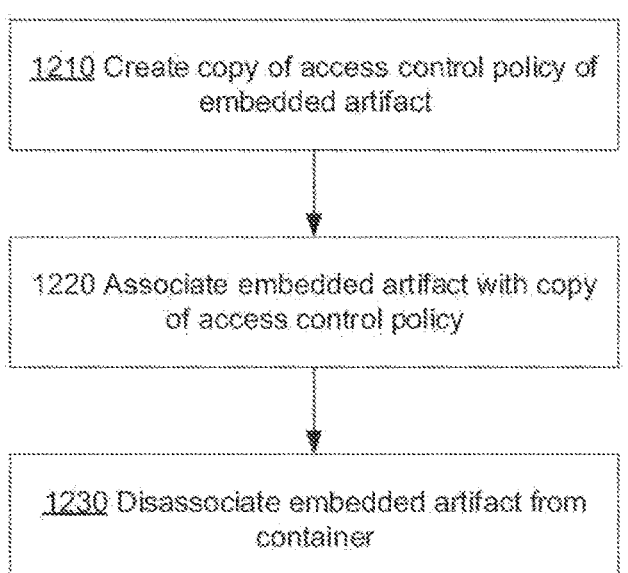

FIG. 12 depicts a flowchart of an example method of disassociating an embedded artifact from its container, in accordance with one or more aspects of the present disclosure. Method 1200 and/or each of its individual functions, routines, subroutines, or operations may be performed by one or more processors of the computer system (e.g., the example computer system 1400 of FIG. 14) implementing the method. In certain implementations, method 1200 may be performed by a single processing thread. Alternatively, method 1200 may be performed by two or more processing threads, each thread executing one or more individual functions, routines, subroutines, or operations of the method. In an illustrative example, the processing threads implementing method 1200 may be synchronized (e.g., using semaphores, critical sections, and/or other thread synchronization mechanisms). Alternatively, the processing threads implementing method 1200 may be executed asynchronously with respect to each other.

At block 1210, a computer system implementing the method may create a copy of the access control policy associated with an embedded artifact, as described in more detail above with reference to FIG. 3.

At block 1220, the computer system may associate the embedded artifact with the copy of the access control policy. The association of the embedded artifact with the copy of the access control policy may be expressed by the access control policy pointer, which may be a part of the metadata of the embedded artifact, as described in more detail above with reference to FIG. 1.

At block 1230, the computer system may disassociate the embedded artifact from its container. For example, the parent-child association of the embedded artifact and its container may be destroyed by moving the embedded artifact out of its container (e.g., to another container), as described in more detail above with reference to FIG. 3. Upon completing the operations of block 1230, the method may terminate.

Figure 13:
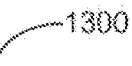
FIG. 13 depicts a flowchart of an example method of sharing an embedded artifact with a user, in accordance with one or more aspects of the present disclosure.
Figure 13:
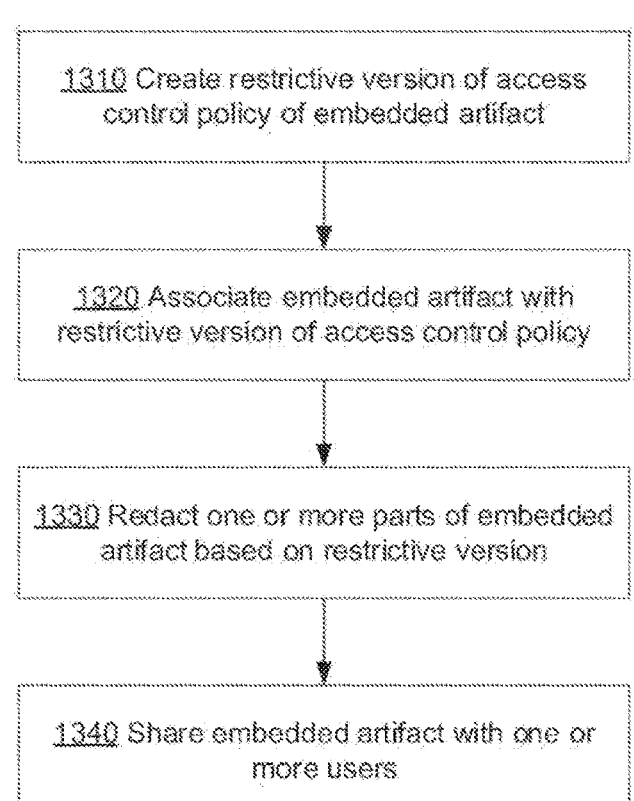

FIG. 13 depicts a flowchart of an example method of sharing an embedded artifact with a user, in accordance with one or more aspects of the present disclosure. Method 1300 and/or each of its individual functions, routines, subroutines, or operations may be performed by one or more processors of the computer system (e.g., the example computer system 1400 of FIG. 14) implementing the method. In certain implementations, method 1300 may be performed by a single processing thread. Alternatively, method 1300 may be performed by two or more processing threads, each thread executing one or more individual functions, routines, subroutines, or operations of the method. In an illustrative example, the processing threads implementing method 1300 may be synchronized (e.g., using semaphores, critical sections, and/or other thread synchronization mechanisms). Alternatively, the processing threads implementing method 1300 may be executed asynchronously with respect to each other.

At block 1310, a computer system implementing the method may create a restrictive version of the access control policy associated with an embedded artifact. For example, the restrictive version of the access control policy may be represented by a subset of the access control policy, such that the subset only includes the access control rules that reference one or more user groups of the user with whom the embedded artifact is to be shared, as described in more detail above with reference to FIG. 2.

At block 1320, the computer system may associate the embedded artifact with the restrictive version of the access control policy. The association of the embedded artifact with the copy of the access control policy may be expressed by the access control policy pointer, which may be a part of the metadata of the embedded artifact, as described in more detail above with reference to FIG. 1.

At block 1330, the computer system may redact one or more parts of the embedded artifact based on the restrictive version of the access control policy. In an illustrative example, the parts that are redacted may include the parts that are associated with the access control rules that are present in the unrestricted version of the access control policy of the embedded artifact, but were removed from the restrictive version of the access control policy, as described in more detail herein above with reference to FIG. 2.

At block 1340, the computer system may share the embedded artifact with the user, as described in more detail above with reference to FIG. 2. Upon completing the operations of block 1340, the method may terminate.

Figure 14:
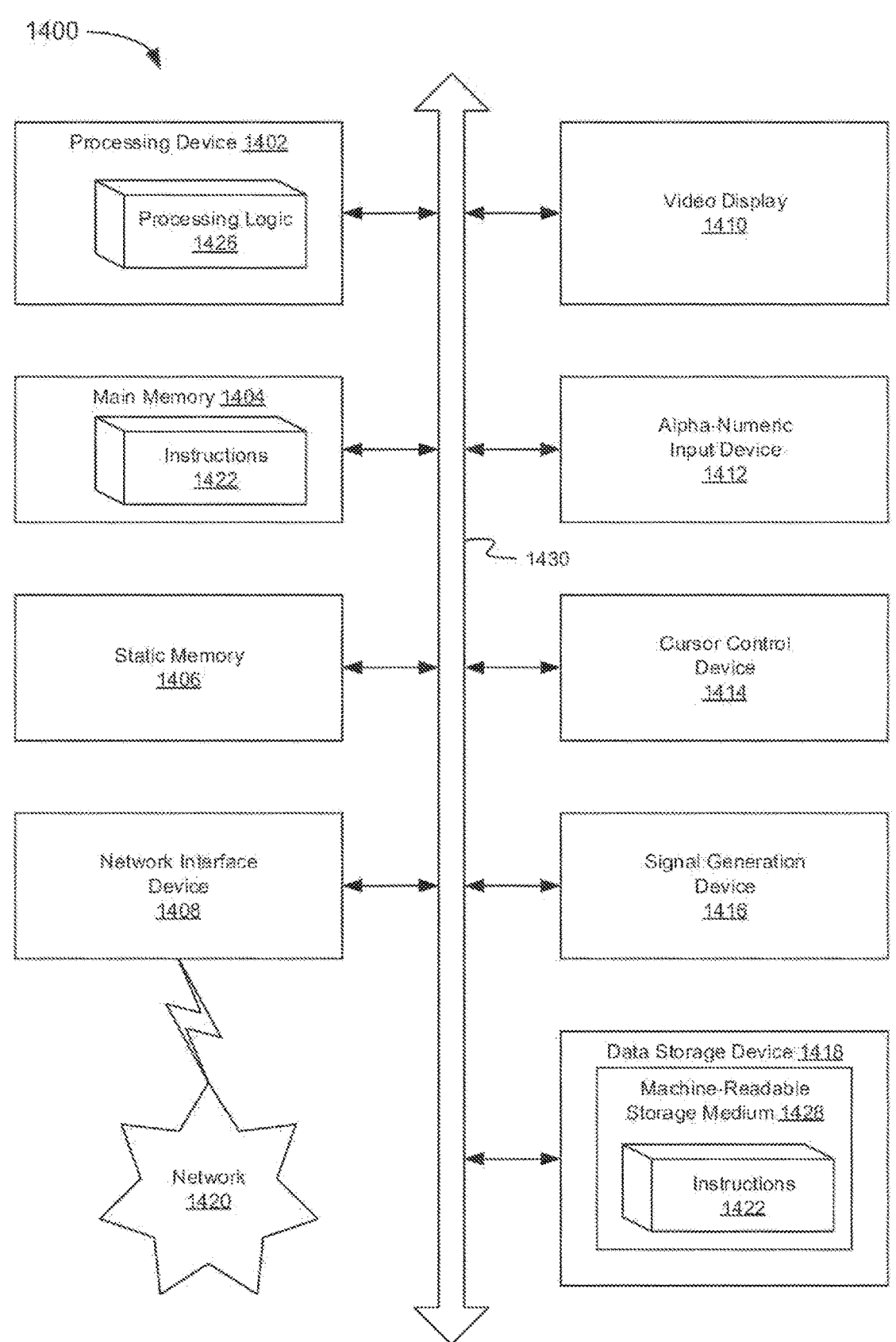
FIG. 14 is a block diagram illustrating a computer system, according to an implementation.

FIG. 14 illustrates a diagrammatic representation of a machine in the exemplary form of a computer system 1400 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server distributed computing system, or as a peer machine in a peer-to-peer (or distributed) distributed computing system. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 1400 may be representative of a computing device, such as a server of application platform 102 running rules-based dataset cleaning system 110 or a client computing system 130.

The exemplary computer system 1400 includes a processing device 1402, a main memory 1404 (e.g., read-only memory (ROM), flash memory, dynamic random access memory (DRAM) (such as synchronous DRAM (SDRAM) or Rambus DRAM (RDRAM), etc.), a static memory 1406 (e.g., flash memory, static random access memory (SRAM), etc.), and a data storage device 1418, which communicate with each other via a bus 1430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. The processing device 1402 is conFig. d to execute processing logic 1426 for performing the operations and steps discussed herein.

The computer system 1400 may further include a network interface device 1408. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), and a signal generation device 1416 (e.g., a speaker).

The data storage device 1418 may include a machine-accessible storage medium 1428, on which is stored one or more set of instructions 1422 (e.g., software) embodying any one or more of the methodologies of functions described herein. The instructions 1422 may also reside, completely or at least partially, within the main memory 1404 and/or within the processing device 1402 during execution thereof by the computer system 1400; the main memory 1404 and the processing device 1402 also constituting machine-accessible storage media. The instructions 1422 may further be transmitted or received over a network 1420 via the network interface device 1408.

The machine-readable storage medium 1428 may also be used to store instructions 1422 of rules-based dataset cleaning, as described herein. While the machine-readable storage medium 1428 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form readable by a machine (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconFig. d by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method for providing granular access control, comprising:

receiving an embedded artifact including a first part and a second part, the first part being associated with a first access control policy, the second part being associated with a second access control policy, the second access control policy being different from the first access control policy;

receiving an association of the embedded artifact with a resource container, the first access control policy being a subset of an access control policy of the resource container;

receiving an access request to access the embedded artifact;

applying the first access control policy to determine whether the access request is grantable for the first part;

applying the second access control policy to determine whether the access request is grantable for the second part; and in response to determining that the access request is grantable for the first part and the access request for the second part, granting the access request;

wherein the method is performed using one or more processors.

2. The method of claim 1, wherein the granting the access request comprises:

generating a redacted first part based on the first part and the first access control policy; and granting an access to the redacted first part.

3. The method of claim 2, wherein the first part includes a first data that is omitted or changed in the redacted first part.

4. The method of claim 1, wherein the applying the first access control policy further comprises:

identifying a permission associated with a user group associated with a user for whom the access request is submitted; and determining whether the permission matches an access type specified by the access request.

5. The method of claim 1, wherein the subset of the access control policy of the resource container includes an intersection of the access control policy of the resource container and an initial access control policy of the embedded artifact;

wherein the initial access control policy is retrieved based on an access control policy pointer in metadata of the embedded artifact.

6. The method of claim 1, further comprising:

creating a copy of the subset of the access control policy;

associating the embedded artifact with the copy of the subset of the access control policy; and disassociating the embedded artifact from the resource container.

7. The method of claim 1, further comprising:

creating a restrictive version of the first access control policy;

associating the embedded artifact with the restrictive version of the first access control policy;

redacting the embedded artifact to generate a redacted embedded artifact based on the restrictive version of the first access control policy; and sharing the redacted embedded artifact with a user that is authorized to access the embedded artifact based on the restrictive version of the first access control policy.

8. A system for providing granular access control, comprising:

one or more memories comprising instructions stored thereon; and one or more processors configured to execute the instructions and perform operations comprising:

receiving an embedded artifact including a first part and a second part, the first part being associated with a first access control policy, the second part being associated with a second access control policy, the second access control policy being different from the first access control policy;

receiving an association of the embedded artifact with a resource container, the first access control policy being a subset of an access control policy of the resource container;

receiving an access request to access the embedded artifact;

applying the first access control policy to determine whether the access request is grantable for the first part;

applying the second access control policy to determine whether the access request is grantable for the second part; and in response to determining that the access request is grantable for the first part and the access request for the second part, granting the access request.

9. The system of claim 8, wherein the granting the access request comprises:

generating a redacted first part based on the first part and the first access control policy; and granting an access to the redacted first part.

10. The system of claim 9, wherein the first part includes a first data that is omitted or changed in the redacted first part.

11. The system of claim 8, wherein the applying the first access control policy further comprises:

identifying a permission associated with a user group associated with a user for whom the access request is submitted; and determining whether the permission matches an access type specified by the access request.

12. The system of claim 8, wherein the subset of the access control policy of the resource container includes an intersection of the access control policy of the resource container and an initial access control policy of the embedded artifact;

wherein the initial access control policy is retrieved based on an access control policy pointer in metadata of the embedded artifact.

13. The system of claim 8, wherein the operations further comprise:

creating a copy of the subset of the access control policy;

associating the embedded artifact with the copy of the subset of the access control policy; and disassociating the embedded artifact from the resource container.

14. The system of claim 8, wherein the operations further comprise:

creating a restrictive version of the first access control policy;

associating the embedded artifact with the restrictive version of the first access control policy;

redacting the embedded artifact to generate a redacted embedded artifact based on the restrictive version of the first access control policy; and sharing the redacted embedded artifact with a user that is authorized to access the embedded artifact based on the restrictive version of the first access control policy.

15. A non-transitory computer readable storage medium comprising executable instructions for providing granular access control that, when executed by one or more processors, cause the one or more processors to perform operations comprising:

receiving an embedded artifact including a first part and a second part, the first part being associated with a first access control policy, the second part being associated with a second access control policy, the second access control policy being different from the first access control policy;

receiving an association of the embedded artifact with a resource container, the first access control policy being a subset of an access control policy of the resource container;

receiving an access request to access the embedded artifact;

applying the first access control policy to determine whether the access request is grantable for the first part;

applying the second access control policy to determine whether the access request is grantable for the second part; and in response to determining that the access request is grantable for the first part and the access request for the second part, granting the access request.

16. The non-transitory computer readable storage medium of claim 15, wherein the granting the access request comprises:

generating a redacted first part based on the first part and the first access control policy; and granting an access to the redacted first part.

17. The non-transitory computer readable storage medium of claim 15, wherein the applying the first access control policy further comprises:

identifying a permission associated with a user group associated with a user for whom the access request is submitted; and determining whether the permission matches an access type specified by the access request.

* * * * *